United States Patent
Kanamori (10) Patent No.: US 8,593,373 B2
(45) Date of Patent: Nov. 26, 2013

(54) HEADUP DISPLAY DEVICE AND METHOD FOR INDICATING VIRTUAL IMAGE

(75) Inventor: Naohito Kanamori, Yokkaichi (JP)

(73) Assignee: Denso Corporation, Kariya (JP)

( * ) Notice: Subject to any disclaimer, the term of this patent is extended or adjusted under 35 U.S.C. 154(b) by 549 days.

(21) Appl. No.: 12/925,964

(22) Filed: Nov. 3, 2010

(65) Prior Publication Data

US 2011/0102483 A1 May 5, 2011

(30) Foreign Application Priority Data

Nov. 5, 2009 (JP) .................................. 2009-254215

(51) Int. Cl.
G09G 5/00 (2006.01)

(52) U.S. Cl.
USPC .............................................. 345/7; 345/690

(58) Field of Classification Search
USPC .............................................. 345/7, 204, 690
See application file for complete search history.

(56) References Cited

U.S. PATENT DOCUMENTS

| 6,720,938 B2 * | 4/2004 | Ohkawara et al. ................. 345/7 |
| 2004/0228136 A1 * | 11/2004 | Bos et al. ........................ 362/488 |
| 2006/0208169 A1 * | 9/2006 | Breed et al. ...................... 250/221 |
| 2008/0294315 A1 * | 11/2008 | Breed ............................ 701/49 |
| 2009/0096937 A1 * | 4/2009 | Bauer et al. ..................... 348/739 |

FOREIGN PATENT DOCUMENTS

| JP | 06-206470 | 7/1994 |
| JP | 2004-314860 | 11/2004 |
| JP | 2004314860 A * | 11/2004 |
| JP | 2007-94130 | 4/2007 |

* cited by examiner

*Primary Examiner* — Viet Pham
(74) *Attorney, Agent, or Firm* — Harness, Dickey, Pierce, PLC (57) ABSTRACT

A headup display device controls a brightness of an image according to a present illumination in an environment of a vehicle and projects the image to a front windshield of the vehicle to indicate the image as a virtual image in an interior of the vehicle. An illumination determination unit determines a present illumination by multiplying an increasing rate by an interior illumination in the interior of the vehicle when being in a light-adapted state, in which the interior of the vehicle is lighter than the exterior of the vehicle. The illumination determination unit determines the present illumination by multiplying a decreasing rate by an exterior illumination in the exterior of the vehicle when being in a dark-adapted state, in which the interior of the vehicle is darker than the exterior of the vehicle. A brightness control unit controls the brightness to correspond to the determined present illumination.

8 Claims, 7 Drawing Sheets

FIG. 8

HEADUP DISPLAY DEVICE AND METHOD FOR INDICATING VIRTUAL IMAGE

CROSS REFERENCE TO RELATED APPLICATIONS

This application is based on and incorporates herein by reference Japanese Patent Application No. 2009-254215 filed on. Nov. 5, 2009.

FIELD OF THE INVENTION

The present invention relates to a headup display device. The present invention further relates to a method for indicating a virtual image.

BACKGROUND OF THE INVENTION

Figure 8:
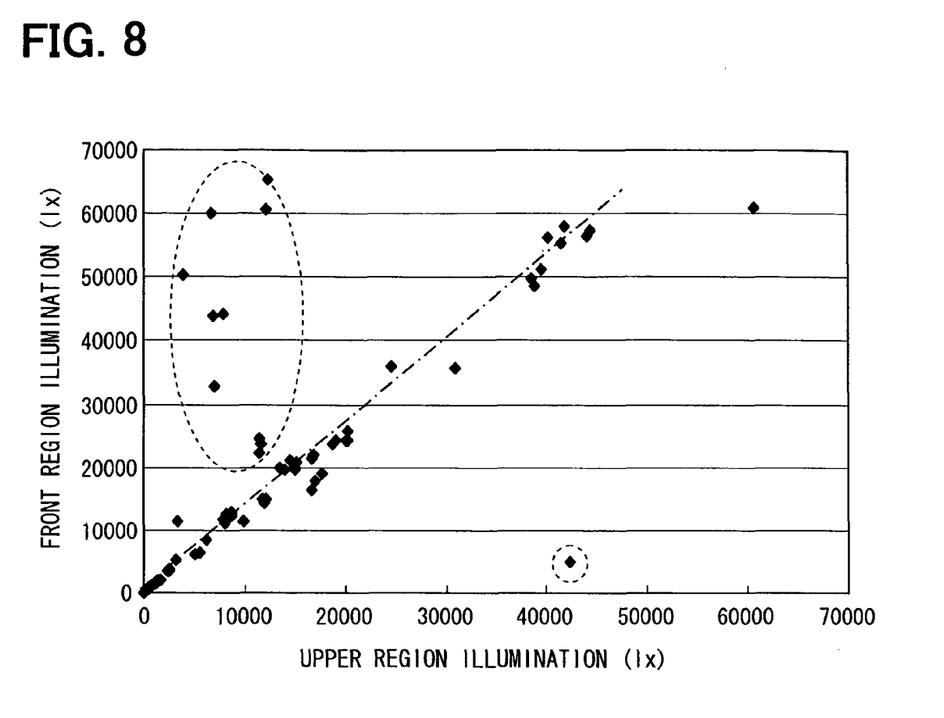
FIG. 8 is a schematic view showing an example of a correlation between an illumination in a front region of a vehicle and an illumination in an upper region of the vehicle.

Conventionally, a known headup display device is configured to control an indication brightness of an image according to a present illumination in an environment of a vehicle. Such a headup display device (HUD device) is further configured to project the image to a front windshield of the vehicle to indicate the image as a virtual image in an interior of the vehicle. For example, JP-A-2007-94130 proposes such an HUD device. The HUD device of JP-A-2007-94130 employs higher one of illumination in a front region of a vehicle and illumination in an upper region of the vehicle as a present illumination and indicates an image with a brightness according to the present illumination. The dashed dotted line of FIG. 8 shows an example of a correlation between the illumination in the front region of the vehicle and the illumination in the upper region of the vehicle. As shown by the region surrounded by the dashed line in FIG. 8, the relation between the illumination in the front region of the vehicle and the illumination in the upper region of the vehicle may collapse in a specific vehicle environment. The JP-A-2007-94130 employs the above indication operation in consideration of such collapse in the correlation in such a specific vehicle environment. The HUD device of JP-A-2007-94130 is configured to indicate the image with high brightness correspondingly to the illumination in the lighter upper region in a state where the upper region of the vehicle is light and the front region of the vehicle is dark. Therefore, the HUD device enables an occupant in an interior of the vehicle to recognize the image easily. The HUD device is also configured to indicate the image with high brightness correspondingly to the illumination in the lighter front region in a state where the upper region of the vehicle is dark and the front region of the vehicle is light. Therefore, also in this case, the HUD device enables an occupant in the interior of the vehicle to recognize the image easily.

It is noted that when the upper region of the vehicle is light and when the front region of the vehicle is dark, the interior of the vehicle becomes lighter than the exterior of the vehicle, in general. Therefore, in this case, eyes of an occupant in the interior of the vehicle are in a state of light adaptation (light-adapted state). The HUD device of JP-A-2007-94130 is configured to employ an indication brightness simply correspondingly to the illumination in the lighter upper region. In this case, the brightness of the image may be insufficient for eyes of the occupant being in the light-adapted state. Consequently, the occupant may cause blurred visual recognition of the image. Alternatively, when the upper region of the vehicle is dark and when the front region of the vehicle is light, the interior of the vehicle becomes darker than the exterior of the vehicle, in general. Therefore, in this case, eyes of an occupant in the interior of the vehicle are in a state of dark adaptation (dark-adapted state). The HUD device of JP-A-2007-94130 is configured to employ an indication brightness simply corresponding to the illumination in the lighter front region. In this case, the brightness of the image may be excessive for eyes of the occupant being in the dark-adapted state. Consequently, the occupant may cause flickering visual recognition of the image.

SUMMARY OF THE INVENTION

In view of the foregoing and other problems, it is an object of the present invention to produce a headup display device configured to enable an occupant in a vehicle to enhance visibility of an image. It is another object of the present invention to produce a method for indicating a virtual image using the headup display device.

According to one aspect of the present invention, a headup display device configured to control a brightness of an image according to a present illumination in an environment of a vehicle and project the image to a front windshield of the vehicle to indicate the image as a virtual image in an interior of the vehicle, the headup display device comprises an illumination determination unit. The illumination determination unit is configured to determine the present illumination by multiplying an increasing rate by an interior illumination, which is an illumination in the interior of the vehicle, in a light-adapted state, in which an interior of the vehicle is lighter than an exterior of the vehicle. The illumination determination unit is further configured to determine the present illumination by multiplying a decreasing rate by an exterior illumination, which is an illumination in the exterior of the vehicle, in a dark-adapted state, in which an interior of the vehicle is darker than the exterior of the vehicle. The headup display device further comprises a brightness control unit configured to control the brightness at a brightness corresponding to the present illumination determined by the illumination determination unit.

According to one aspect of the present invention, a method for indicating a virtual image in an interior of a vehicle according to a present illumination in an environment of the vehicle, the method comprises determining the present illumination by multiplying an increasing rate by an interior illumination, which is an illumination in the interior of the vehicle, in a light-adapted state, in which an interior of the vehicle is lighter than an exterior of the vehicle. The method further comprises determining the present illumination by multiplying a decreasing rate by an exterior illumination, which is an illumination in the exterior of the vehicle, in a dark-adapted state, in which an interior of the vehicle is darker than an exterior of the vehicle. The method further comprises controlling a brightness of an image corresponding to the determined present illumination. The method further comprises projecting the image to a front windshield of the vehicle to indicate the image as the virtual image in the interior of the vehicle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1:
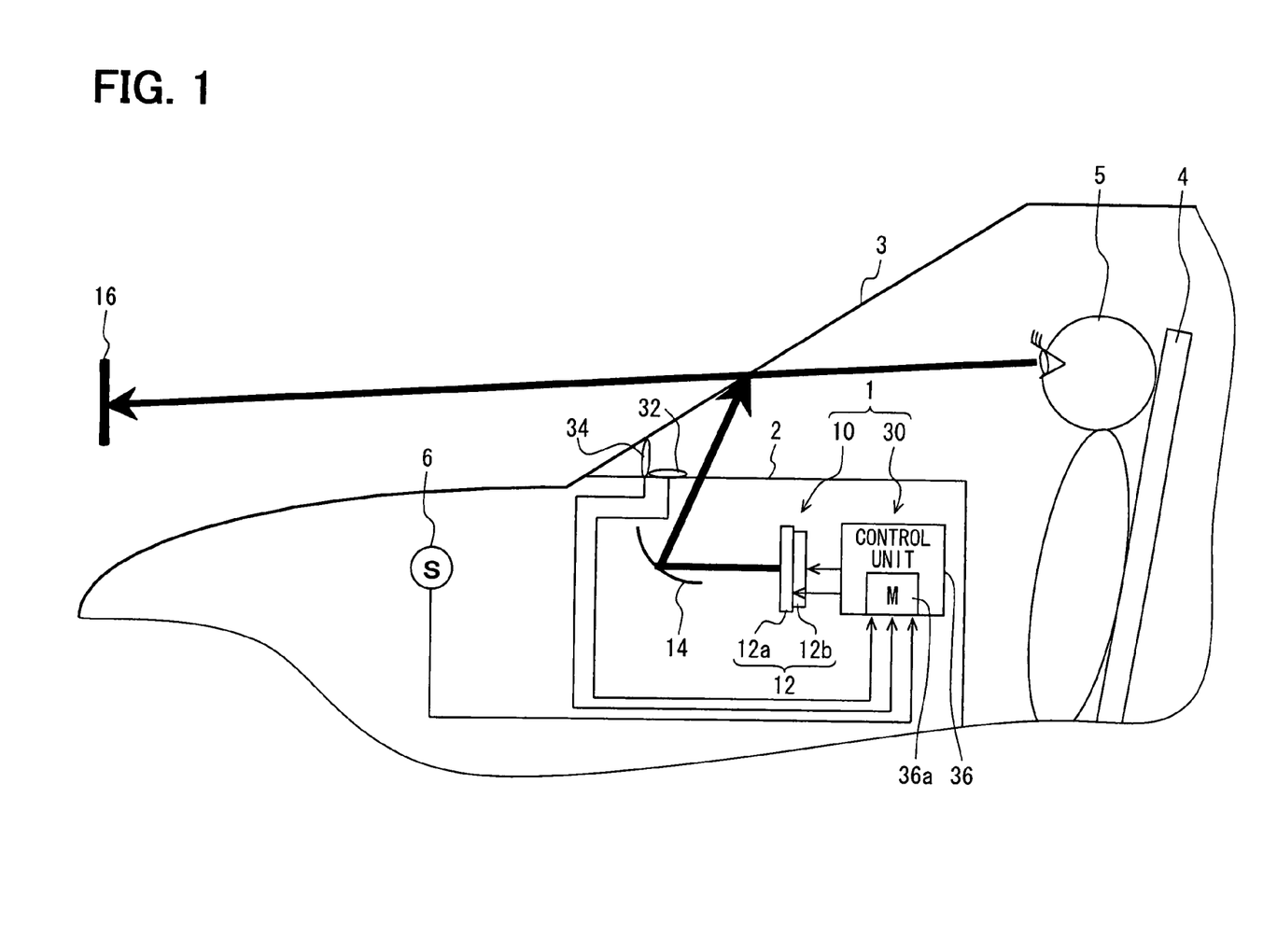
FIG. 1 is a schematic view showing an HUD device according to one embodiment.

As follows, embodiments of the present invention will be described with reference to drawings. As shown in FIG. 1, an headup display (HUD) device 1 according to one embodiment of the present invention includes a display unit 10, a control unit 30, and the like. The HUD device 1 is equipped to a vehicle such as an automobile.

The display unit 10 is provided in an instrument panel 2 of the vehicle. The display unit 10 includes an image display device 12 and an optical system 14.

The image display device 12 is located such that a screen of a display panel 12a of the image display device 12 is directed toward the optical system 14. The display panel 12a is, for example, a dot-matrix type TFT transmissive LCD monitor having a screen configured of multiple liquid crystal pixels arranged in a two dimensional plane. The display panel 12a activates the pixels to indicate an image 16 on the screen. A light source 12b such as a light emitting diode is provided behind the display panel 12a of the image display device 12. The light source 12b emits light to illuminate a translucent indication image 16 of the display panel 12a thereby projecting the indication image 16 on an indication area.

Figure 2:
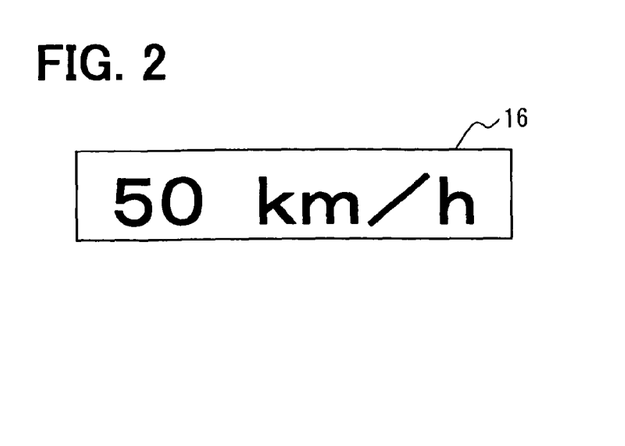
FIG. 2 is a schematic diagram showing an image indicated by the image display device of FIG. 1.

For example, the optical system 14 includes a combination of a mirror, a lens, and the like. The optical system 14 projects the translucent image 16, which is indicated on the display panel 12a of the image display device 12 and illuminated by the light source 12b, as an optical image on a front windshield 3 of the vehicle. The projected image 16 is formed in front of the front windshield 3 and indicated as a virtual image on the side of a driver seat 4 in the vehicle. An occupant 5 seated on the driver seat 4 visually recognizes the image 16 indicated on the focus position ahead of the occupant 5. Thereby, the occupant 5 receives information of the image 16. According to the present embodiment, as shown in FIG. 2, the image 16 in a predetermined color shows information on a traveling speed of the vehicle. It is noted that the image 16 may show other vehicle information, such as information on remaining fuel of the vehicle and information on temperature of circulating water of the vehicle.

Referring to FIG. 1, the display unit 10 is equipped with the control unit 30 including an interior illuminance sensor 32, an exterior illuminance sensor 34, and a control circuit 36.

Figure 3:
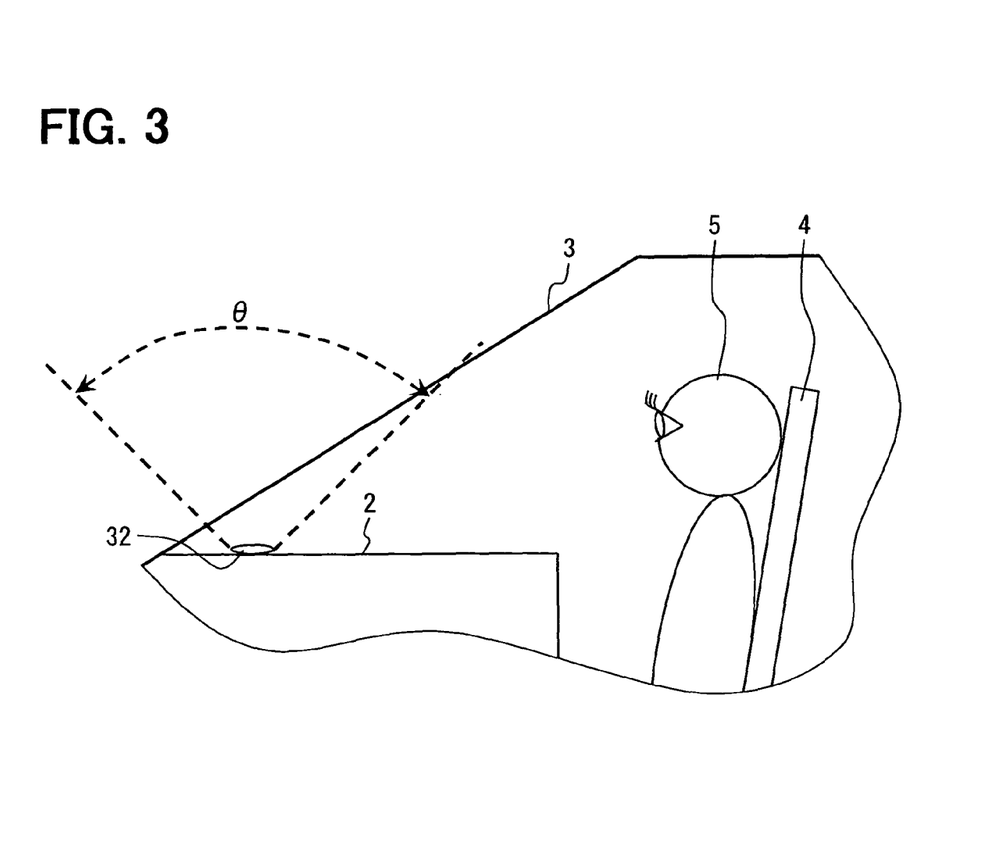
FIG. 3 is a schematic view showing a detection area of an interior illuminance sensor of the image display device in FIG. 1.

The interior illuminance sensor 32 includes, for example, a photo transistor or a photo diode. The interior illuminance sensor 32 is equipped on an upper portion of the instrument panel 2. As shown in FIG. 3, the interior illuminance sensor 32 has a detection area in an upper portion of the instrument panel 2 and detects an illumination Li in the vehicle. The detection area of the interior illuminance sensor 32 has a predetermined angle range θ. The interior illuminance sensor 32 is not limited to detect an illumination Li in the upper portion of the instrument panel 2. For example, the interior illuminance sensor 32 may detect an illumination Li in another area in the interior of the vehicle, such as a lower portion of a roof of the vehicle, an upper portion of a floor panel, and the like.

Figure 4:
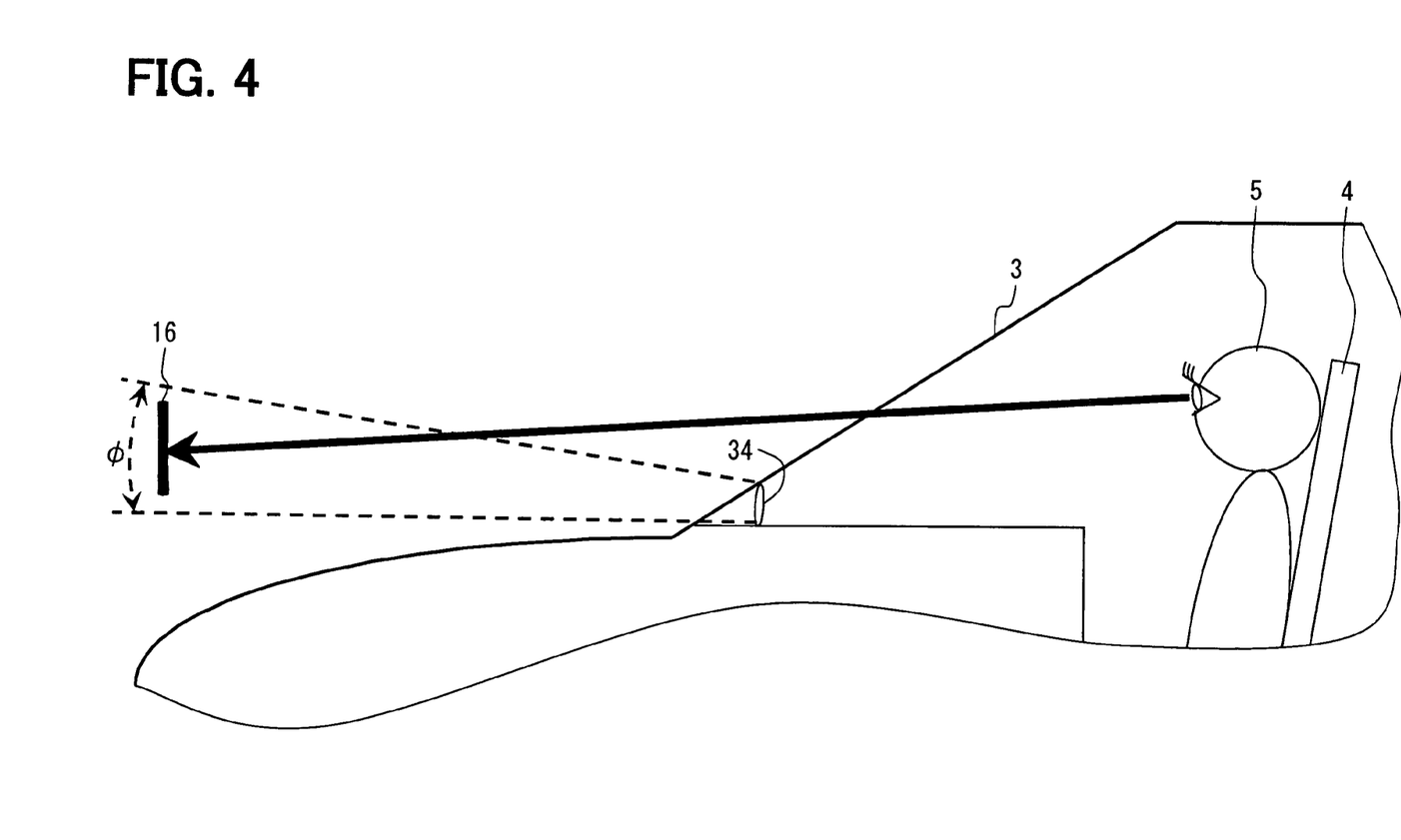
FIG. 4 is a schematic view showing a detection area of an exterior illuminance sensor of the image display device in FIG. 1.

The exterior illuminance sensor 34 includes, for example, a photo transistor or a photo diode. The exterior illuminance sensor 34 is equipped on an upper portion of the instrument panel 2. As shown in FIG. 4, the exterior illuminance sensor 34 has a detection area in front of the front windshield 3 and detects an illumination Lo outside the vehicle. The detection area of the exterior illuminance sensor 34 has a predetermined angle range φ. In the present embodiment, it is supposed that a general occupant 5 seated on the driver seat 4 has a viewing angle with respect to the image 16, and the viewing angle is superimposed on the detection angle of the exterior illuminance sensor 34. In this way, as shown in FIG. 4, a region including the focus position of the image 16 in front of the front windshield 3 is assigned as the detection range φ of the exterior illuminance sensor 34. For example, the exterior illuminance sensor 34 may be provided in a rearview mirror or the like, as long as being capable of detecting the exterior illumination Lo in the detection area φ.

For example, the control circuit 36 shown in an FIG. 1 is configured of a microcomputers or the like including a storage unit 36a. The control circuit 36 is located in the instrument panel 2. Specifically, the control circuit 36 is located in the vicinity of the image display device 12 or inside of the image display device 12. The control circuit 36 is electrically connected with the display panel 12a and the light source 12b of the image display device 12, the illuminance sensors 32 and 34, and a vehicle information sensor 6. The vehicle information sensor 6 according to the present embodiment is configured to detect a vehicle running speed, which is indicated by the image 16. The vehicle information sensor 6 may arbitrary detect various objects to be indicated by the image 16.

According to the present structure, the control unit 30 causes the control circuit 36 to input a signal, which represents the interior illumination Li detected by using the interior illuminance sensor 32, a signal, which represents the exterior illumination Lo detected by using the exterior illuminance sensor 34, and a signal, which represents the vehicle running speed detected by using the vehicle information sensor 6. The control circuit 36 controls activation of the pixels of the display panel 12a and luminescence of the light source 12b according to the input signals. Thereby, the control circuit 36 controls brightness of the image 16 on the image display device 12. As follows, a brightness control performed when the control circuit 36 executes a computer program stored in the storage unit 36a will be described in detail.

Figure 5:
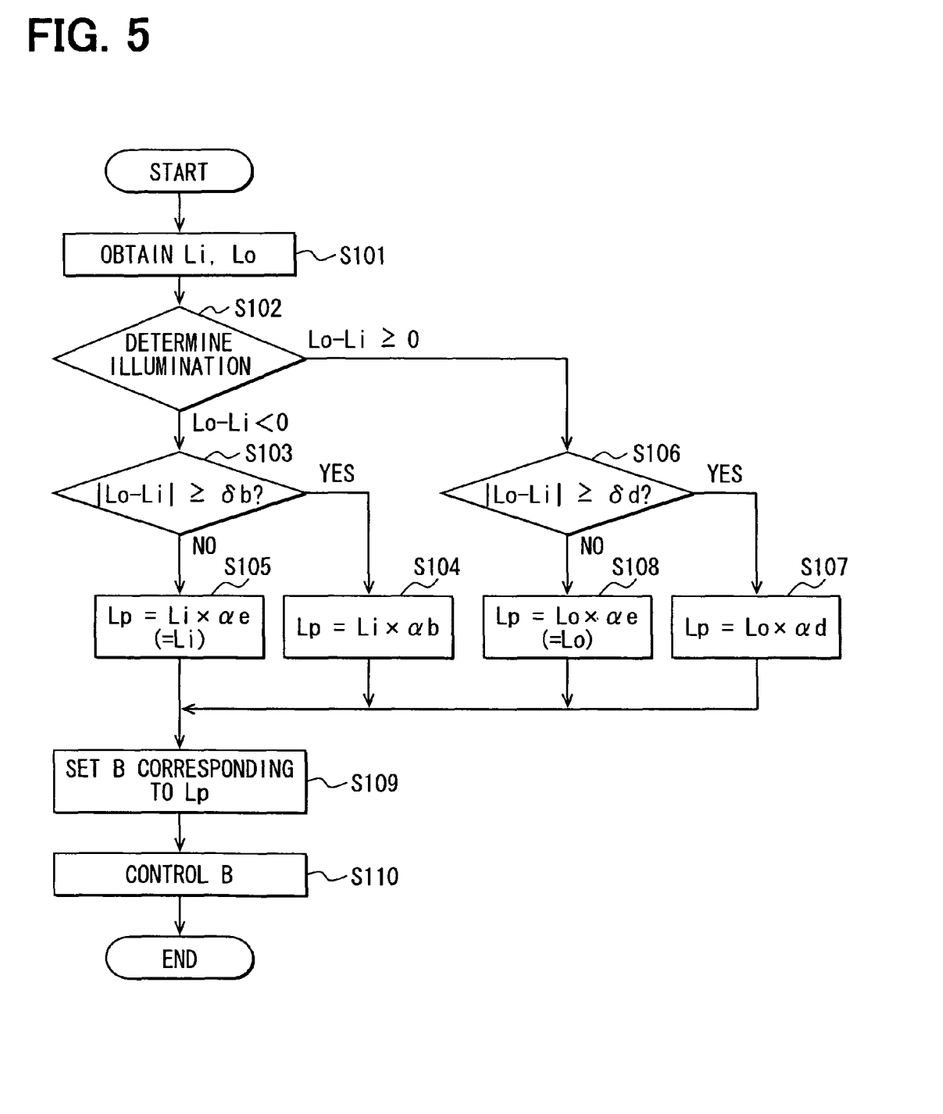
FIG. 5 is a flow chart showing a brightness control performed by a control circuit of the image display device in FIG. 1.

FIG. 5 shows a flow chart of the brightness control performed by the control circuit 36. The brightness control is started in response to activation (ON) of an ignition switch device of the vehicle and terminated in response to deactivation (OFF) of the ignition switch device.

In the brightness control, at step S101, the interior illumination Li and the exterior illumination Lo are obtained according to the input signals respectively from the interior illuminance sensor 32 and the exterior illuminance sensor 34 for determining the present illumination Lp of a vehicle environment.

At subsequent step S102, it is determined which one of the interior illumination Li and the exterior illumination Lo obtained at step S101 is higher than the other. Specifically, a relative value (Lo−Li) is first calculated as an illumination difference between the interior illumination Li and the exterior illumination Lo. Subsequently, when the calculated illumination difference (Lo−Li) is less than 0, the interior illumination Li is higher than the exterior illumination Lo. In this case, it is determined to be a light-adapted state in which the interior of the vehicle is lighter than the exterior of the vehicle. Thus, the processing proceeds to step S103. Contrary, when the calculated illumination difference (Lo−Li) is greater than or equal to 0, the interior illumination Li is lower than the exterior illumination Lo. In this case, it is determined to be a dark-adapted state in which the interior of the vehicle is darker than the exterior of the vehicle. Thus, the processing proceeds to step S106. In the present embodiment; when the calculated illumination difference (Lo−Li) is 0, that is, when the interior illumination Li is substantially equal to the exterior illumination Lo within sensitivity ranges of the illuminance sensors 32 and 34, the processing proceeds to step S106. Alternatively, in such a case, the processing may proceed to step S103.

At step S103, which is one of branched steps from step S102, it is determined whether an illumination difference between the interior illumination Li and the exterior illumination Lo obtained at step S101 is greater than or equal to a predetermined light adaptation threshold δb. Specifically, an absolute value |Lo−Li| is calculated as an illumination difference between the interior illumination Li and the exterior illumination Lo. Subsequently, when the calculated illumination difference |Lo−Li| is greater than or equal to the light adaptation threshold δb, the processing proceeds to step S104. Alternatively, when the calculated illumination difference |Lo−Li| is less than the light adaptation threshold δb, the processing proceeds to step S105. The light adaptation threshold δb is a lower limit of the range of the illumination difference |Lo−Li|. The range of the illumination difference |Lo−Li| may be beforehand determined by an experiment, for example, in consideration of causing a feeling of blurred visual recognition of the image 16 due to light adaptation of eyes of an occupant 5. The light adaptation threshold δb may be determined on the safety side as much as possible.

The processing proceeds to step S104 when it is determined that the illumination difference is greater than or equal to the light adaptation threshold δb. At step S104, an increasing rate αb is multiplied by the interior illumination Li obtained at step S101 to obtain a value (Li×αb) as the present illumination Lp. The increasing rate αb is determined such that the multiplication of the increasing rate αb with the interior illumination Li becomes greater than the illumination Li before the multiplication. In the present embodiment, the increasing rate αb is set to a fixed value, such as 1.3, greater than 1. Alternatively, the increasing rate αb may be a variable greater than 1 and changeable according to the magnitude of the illumination difference.

The processing proceeds to step S105 when it is determined that the illumination difference is less than the light adaptation threshold δb. At step S105, a constant rate αe is multiplied by the interior illumination Li obtained at step S101 to obtain a value (Li×αe) as the present illumination Lp. The constant rate αe is determined such that the multiplication of the constant rate αe with the interior illumination Li is substantially the same as the illumination Li before the multiplication. In the present embodiment, the constant rate αe is set to 1.

In this way, when the state of the interior of the vehicle is in the light-adapted state with respect to the eyes of the occupant 5, the zoom rate to be multiplied by the illumination Li, which is lighter than the illumination Lo, is switched according to the difference between the illuminations Li and Lo. Thus, the present illumination Lp is determined.

The above description is related to an operation when the interior illumination Li is greater than the exterior illumination Lo. As follows, an operation when the interior illumination Li is less than the exterior illumination Lo or substantially equal to the exterior illumination Lo will be described. At step S106, which is the other of branched steps from step S102, it is determined whether the illumination difference between the interior illumination Li and the exterior illumination Lo obtained at step S101 is greater than or equal to a predetermined dark adaptation threshold δd. Specifically, an absolute value |Lo−Li| is calculated as the illumination difference between the interior illumination Li and the exterior illumination Lo. Subsequently, when the calculated illumination difference |Lo−Li| is greater than or equal to the dark adaptation threshold δd, the processing proceeds to step S107. Alternatively, when the calculated illumination difference |Lo−Li| is less than the dark adaptation threshold δd, the processing proceeds to step S108. The dark adaptation threshold δd is a lower limit of the range of the illumination difference |Lo−Li|. The range of the illumination difference |Lo−Li| may be beforehand determined by an experiment, for example, in consideration of causing a feeling of flickering visual recognition of the image 16 due to dark adaptation of the eyes of the occupant 5. The dark adaptation threshold δd may be determined on the safety side as much as possible. In the present embodiment, the dark adaptation threshold δd is set to the same value as the light adaptation threshold δb. Alternatively, the dark adaptation threshold δd may be set to a different value from the light adaptation threshold δb.

The processing proceeds to step S107 when it is determined that the illumination difference is greater than or equal to the dark adaptation threshold δd. At step S107, a decreasing rate αd is multiplied by the exterior illumination Lo obtained at step S101 to obtain a value (Lo×αd) as the present illumination Lp. The decreasing rate αd is determined such that the multiplication of the decreasing rate αd with the exterior illumination Lo becomes less than the illumination Lo before the multiplication. In the present embodiment, the decreasing rate αd is set to a fixed value, such as 0.8, less than 1. Alternatively, the decreasing rate αd may be a variable less than 0 and changeable according to the magnitude of the illumination difference.

The processing proceeds to step S108 when it is determined that the illumination difference is less than the dark adaptation threshold δd. At step S108, a constant rate αe is multiplied by the exterior illumination Lo obtained at step S101 to obtain a value (Lo×αe) as the present illumination Lp. The constant rate αe may be the same as that of above-described step S105.

In this way, when the state of the interior of the vehicle is in the dark-adapted state with respect to the eyes of the occupant 5, the zoom rate to be multiplied by the illumination Lo, which is lighter than the illumination Li, is switched according to the difference between the illuminations Li and Lo. Thus, the present illumination Lp is determined.

Figure 6:
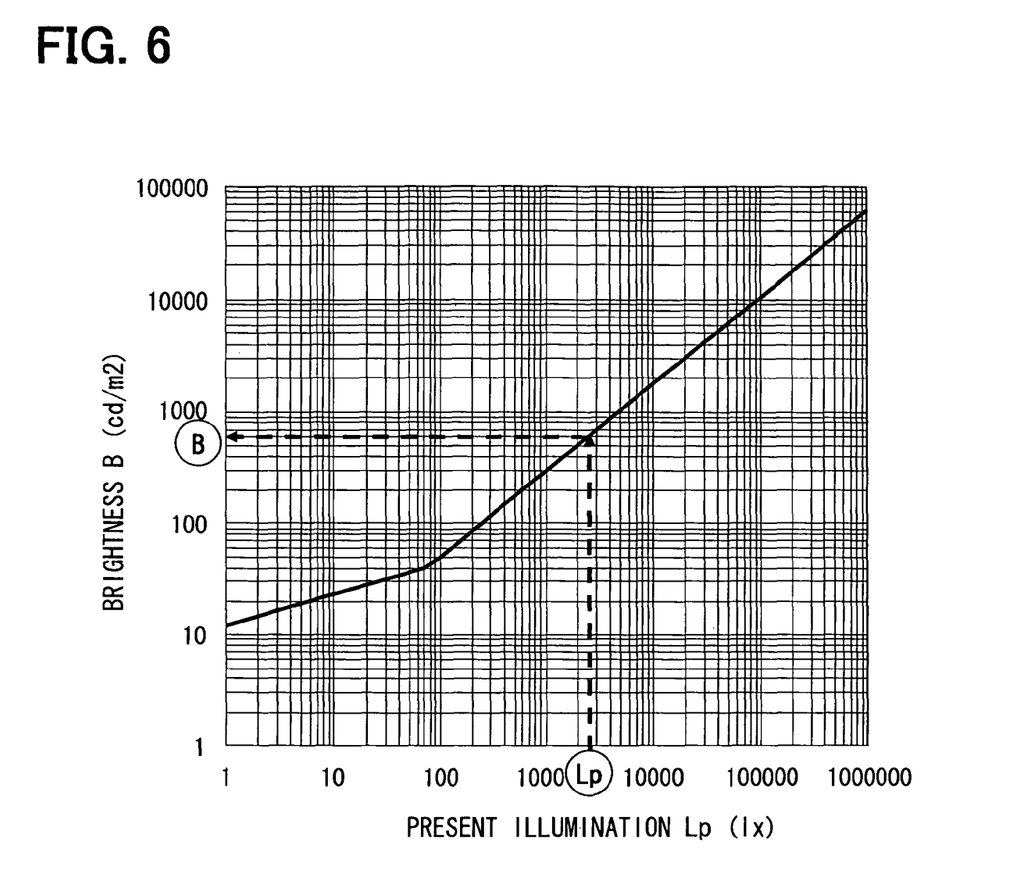
FIG. 6 is a schematic view showing a data map specifying a correlation between a present illumination and an indication brightness stored in a storage unit of the image display device in FIG. 1.

After the present illumination Lp is determined at one of steps S104, S105, 107, and S108, the processing proceeds to step S109. At step S109, a brightness corresponding to the present illumination Lp is set as an indication brightness B of the image 16 indicated by the image display device 12. Specifically, according to the present embodiment, as shown in FIG. 6, a correlation between the present illumination Lp and the indication brightness B is defined by the data map for corresponding indication color of the image 16. The data map is beforehand stored in the storage unit 36a of the control circuit 36. At step S109, the data map of the correlation is retrieved from the storage unit 36a. Thus, the indication brightness B corresponding to the present illumination Lp is read from the data map of FIG. 6.

Subsequent to the acquisition of the indication brightness. B, the processing proceeds to step S110. At step S110, the image display device 12 is manipulated to control the brightness of the indicated image 16 at the obtained brightness B. Specifically, according to the present embodiment, the light source 12b of the image display device 12 is pulse-width-modulation (PWM) controlled, thereby the luminescence of the light source 12b is manipulated. In this case, a frequency characteristic of the PWM control of the light source 12b is changed thereby to obtain the indication brightness B. As described above, the indication brightness B of the image display device 12 may be controlled by manipulating the luminescence brightness of the light source 12b. Alternatively, the indication brightness B of the image display device 12 may be controlled by manipulating gradation values of the pixels of the display panel 12a. In addition, the indication brightness B of the image display device 12 may be controlled by manipulating both the luminescence brightness of the light source 12b and the gradation values of the pixels of the display panel 12a.

In this way, the control of the indication brightness at the indication brightness B is completed. Thereafter, the processing returns to step S101, and the processing is repeated before the ignition switch device is deactivated (turned OFF). As described above, according to the present embodiment, the indication brightness B of the image 16 indicated in the image display device 12 is successively manipulated based on the present illumination Lp determined in consideration of the interior illumination Li and the exterior illumination Lo.

The HUD device 1 described above is configured to control the indication brightness of the image 16 at the brightness B corresponding to the present illumination Lp, which is determined by multiplying the increasing rate αb by the interior illumination Li, when being in the light-adapted state. In the light-adapted state, the illumination difference between the interior illumination Li and the exterior illumination Lo is greater than or equal to the predetermined threshold δb. In this way, sufficient brightness of the image 16 can be secured for the eyes of the occupant 5 being in the light-adapted state in the interior of the vehicle. Therefore, occurrence of blurred visual recognition of the image 16 can be restrained in the light-adapted state. Contrary, when the illumination difference is less than the threshold δb, the eyes of the occupant 5 performs a small light adaptation operation. In this case, a blurred visual recognition of the image 16 may not occur so significantly, without increasing of the indication brightness B of the image 16. Therefore, in this case, the value obtained by multiplying the constant rate αe by the illumination Li, which is brighter one of the illuminations Li and Lo, is employed as the present illumination Lp for determining the indication brightness B. That is, in this case, the interior illumination Li is employed substantially as it is (step S105 of FIG. 5).

The HUD device 1 described above is further configured to control the indication brightness of the image 16 at the brightness B corresponding to the present illumination Lp, which is determined by multiplying the decreasing rate αd by the exterior illumination Lo, when being in the dark-adapted state. In the dark-adapted state, the illumination difference between the interior illumination Li and the exterior illumination Lo is greater than or equal to the predetermined threshold δd. In this way, restrained brightness of the image 16 can be secured for the eyes of the occupant 5 being in the dark-adapted state in the interior of the vehicle. Therefore, occurrence of flickering visual recognition of the image 16 can be restrained in the dark-adapted state. When the illumination difference is less than the threshold δd, the eyes of the occupant 5 performs a small dark adaptation operation. In this case, a flickering visual recognition of the image 16 may not occur so significantly, without restraining of the indication brightness B of the image 16. Therefore, in this case, the value obtained by multiplying the constant rate αe by the illumination Lo, which is brighter one of the illuminations Li and Lo, is employed as the present illumination Lp for determining the indication brightness B. That is, in this case, the exterior illumination Lo is employed substantially as it is (step S108 of FIG. 5).

The HUD device 1 is further configured to detect the exterior illumination Lo in the vehicle front region φ (FIG. 4) including the focus position of the virtual image caused by the projection of the image 16 to the front windshield 3. The detected exterior illumination Lo is used for determining the present illumination Lp. In this way, the exterior illumination Lo around the focus position, in which the virtual indication of the image 16 is formed and visually recognized by the occupant 5 in the interior of the vehicle, is reflected on the determination of the present illumination Lp. Therefore, the indication brightness B controlled correspondingly to the present illumination Lp can be optimized to visual recognition of the image in the focus position.

In addition, in the HUD device 1, the data map, which is stored in the storage unit 36a of the control circuit 36, defines the correlation between the present illumination Lp and the indication brightness B. The data map is commonly used for the interior illumination Li and the exterior illumination Lo used for determination of the present illumination Lp. The common use of the data map is enabled by the determination method of the present illumination Lp by multiplying the suitable one ratio of αb, αd, αe by one of the interior illumination Li and the exterior illumination Lo. The interior illumination Li and the exterior illumination Lo vary independently from each other. In this way, the correlation between the present illumination Lp and the indication brightness B can be commonly used irrespective of the illumination Li and Lo. Thus, the capacity of the storage unit 36a for storing the correlation can be reduced, thereby to result in cost reduction.

In the above embodiment, the control circuit 36 configured to execute steps S101 to S108 may be equivalent to an illumination determination unit. In addition, the control circuit 36 including the storage unit 36a and configured to execute steps S109, S110 may be equivalent to a brightness control unit.

Other Embodiment

As described above, the present invention is not limited to the above embodiment, and is capable of being applied to various embodiments as long as being undeviating from the gist thereof.

Figure 7:
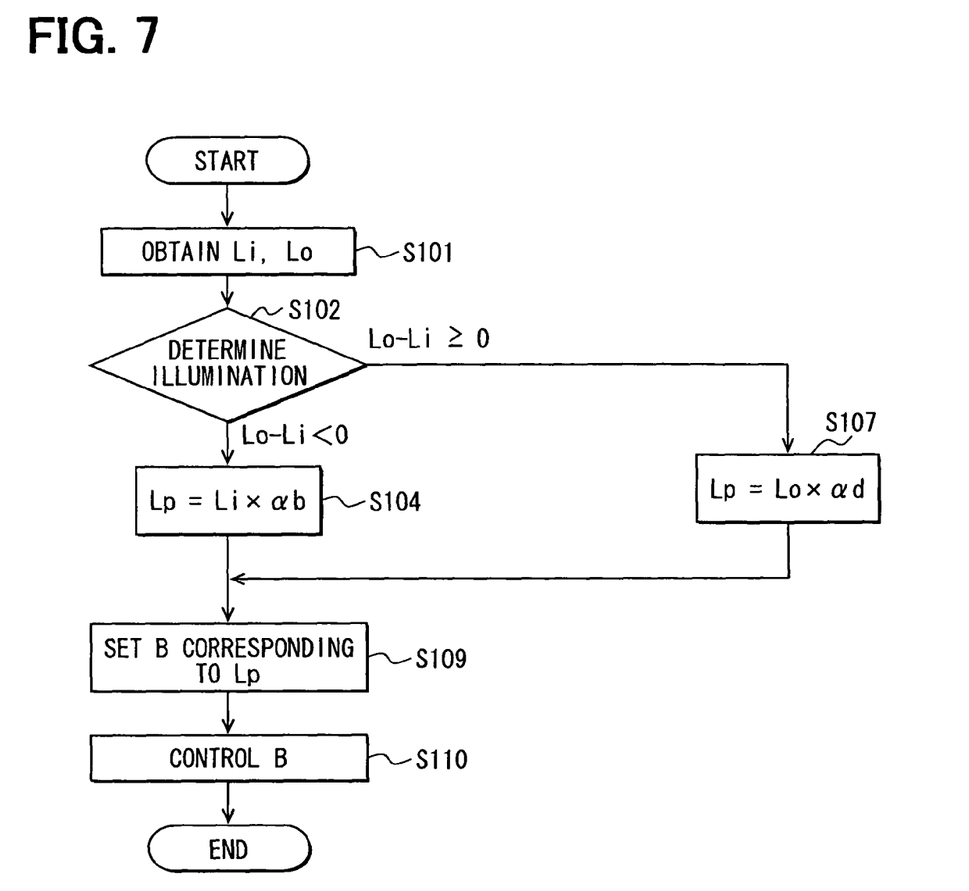
FIG. 7 is a flow chart showing a modification of the brightness control of FIG. 5.

For example, as shown in FIG. 7, the present illumination Lp may be determined without executing steps S103, S105 of FIG. 5 regularly in the light-adapted state. Specifically, the present illumination Lp may be determined by multiplying the increasing rate αb by the interior illumination Li regularly in the light-adapted state. Alternatively, as shown in FIG. 7, the present illumination Lp may be determined without executing steps S106, S108 of FIG. 5 regularly in the dark-adapted state. Specifically, the present illumination Lp may be determined by multiplying the decreasing rate αd by the exterior illumination Lo regularly in the dark-adapted state.

Summarizing the above embodiment, a headup display device is configured to control an indication brightness of an image according to a present illumination in an environment of a vehicle and project the image to a front windshield of the vehicle to indicate the image as a virtual image in an interior of the vehicle. The headup display device includes an illumination determination unit. The illumination determination unit is configured to determine a present illumination by multiplying an increasing rate by an interior illumination, which is an illumination in the interior of the vehicle, in a light-adapted state, in which an interior of the vehicle is lighter than an exterior of the vehicle. The illumination determination unit is further configured to determine a present illumination by multiplying a decreasing rate by an exterior illumination, which is an illumination in the exterior of the vehicle, in a dark-adapted state, in which an interior of the vehicle is darker than an exterior of the vehicle. The headup display device further includes a brightness control unit configured to control the indication brightness at a brightness corresponding to the present illumination determined by the illumination determination unit.

In this way, in the light-adapted state, in which the interior of the vehicle is lighter than the exterior of the vehicle, the indication brightness of the image is controlled at the brightness corresponding to the present illumination determined by multiplying the increasing rate by the interior illumination. Therefore, the image can be indicated with sufficient brightness in the interior of the vehicle for eyes of an occupant being in the light-adapted state. Thus, an occupant being in the light-adapted state can be restrained from causing blurred visual recognition of the image. In a dark-adapted state, in which the interior of the vehicle is darker than the exterior of the vehicle, the indication brightness of the image is controlled at the brightness corresponding to the present illumination determined by multiplying the decreasing rate by the exterior illumination. Therefore, the image can be indicated with restrained brightness in the interior of the vehicle for eyes of an occupant being in the dark-adapted state. Thus, an occupant being in the dark-adapted state can be restrained from causing flickering visual recognition of the image. Thus, the restraining operation of the brightness enables an occupant to enhance visibility of the image.

The increasing rate is greater than 1, when a constant rate, which does not change the illumination by the multiplication, is 1. The decreasing rate is less than 1, when the constant rate, which does not change the illumination by the multiplication, is 1.

In the light-adapted state, the illumination determination unit is configured to set a rate, which is to be multiplied by the interior illumination for determining the present illumination, to the increasing rate, when an illumination difference between the interior illumination and the exterior illumination is greater than or equal to a predetermined light adaptation threshold. The illumination determination unit is further configured to switch the rate, which is to be multiplied by the interior illumination for determining the present illumination, from the increasing rate to the constant rate when the illumination difference is less than the light adaptation threshold.

In this way, in the light-adapted state, in which the illumination difference between the interior illumination and the exterior illumination is greater than or equal to the predetermined light adaptation threshold, the indication brightness is controlled correspondingly to the present illumination determined by multiplying the increasing rate by the interior illumination. Therefore, the image can be indicated with sufficient brightness for eyes of an occupant. Contrary, in the light-adapted state, in which the illumination difference between the interior illumination and the exterior illumination is less than the light adaptation threshold, the indication brightness is controlled according to the interior illumination, which is the lighter one, correspondingly to the present illumination determined by multiplying the interior illumination by the constant rate instead of the increasing rate. When a light adaptation operation of eyes of an occupant becomes small due to the small illumination difference, the occupant hardly causes blurred visual recognition resulting from the light adaptation operation. Therefore, in this case, the image can be indicated with high visibility by the indication brightness control with the interior illumination as it is.

In the dark-adapted state, the illumination determination unit is configured to set a rate, which is to be multiplied by the exterior illumination for determining the present illumination, to the decreasing rate, when an illumination difference between the interior illumination and the exterior illumination is greater than or equal to a predetermined dark adaptation threshold. The illumination determination unit is further configured to switch the rate, which is to be multiplied by the exterior illumination for determining the present illumination, from the decreasing rate to the constant rate when the illumination difference is less than the dark adaptation threshold.

In this way, in the dark-adapted state, in which the illumination difference between the interior illumination and the exterior illumination is greater than or equal to the predetermined dark adaptation threshold, the indication brightness is controlled correspondingly to the present illumination determined by multiplying the decreasing rate by the exterior illumination. Therefore, the image can be indicated with restrained brightness for eyes of an occupant. Contrary, in the dark-adapted state, in which the illumination difference between the interior illumination and the exterior illumination is less than the dark adaptation threshold, the indication brightness is controlled according to the exterior illumination, which is the lighter one, correspondingly to the present illumination determined by multiplying the exterior illumination by the constant rate instead of the decreasing rate. When a dark adaptation operation of eyes of an occupant becomes small due to the small illumination difference, the occupant hardly causes flickering visual recognition resulting from the dark adaptation operation. Therefore, in this case, the image can be indicated with high visibility by the indication brightness control with the exterior illumination as it is.

The illumination determination unit is configured to determine the illumination difference according to the exterior illumination in a vehicle front region including a focus position of the virtual image. In this way, the illumination difference between the exterior illumination and the interior illumination is determined according to the exterior illumination in the vehicle front region including the focus position at which the virtual image is formed by projection of the image to the front windshield. Thus, the illumination difference is used for setting the rate for determining the present illumination. In this way, the exterior illumination around the focus position, in which the virtual indication of the image is formed and visually recognized by the occupant in the interior of the vehicle, is reflected on the determination of the present illumination. Therefore, the indication brightness controlled correspondingly to the present illumination can be optimized to visual recognition of the image in the focus position.

The brightness control unit includes a storage unit configured to store a correlation, which is common to an arbitrary magnitude relation between the interior illumination and the exterior illumination, as a correlation between the present illumination determined by the illumination determination unit and the indication brightness corresponding to the present illumination. In this way, the correlation between the present illumination and the indication brightness stored in the storage unit is communalized with respect to an arbitrary magnitude relation between the interior illumination and exterior illumination taken into consideration in the determination of the present illumination. This is a storing form enabled by the method in which one of the interior illumination and the exterior illumination, which have the arbitrary magnitude relation therebetween, is multiplied by the suitable rate to obtain the present illumination. Such a storing form enables reduction in the storage capacity needed for storing a correlation used for controlling the indication brightness correspondingly to the present illumination. Thus, cost reduction can be enabled.

The above structures of the embodiments can be combined as appropriate. The above processings such as calculations and determinations are not limited being executed by the control unit 30. The control unit may have various structures including the control unit 30 shown as an example. The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A headup display device configured to control a brightness of an image according to a present illumination in an environment of a vehicle and project the image to a front windshield of the vehicle to indicate the image as a virtual image in an interior of the vehicle, the headup display device comprising:
    an interior illuminance sensor detecting an interior illumination, wherein the interior illumination is an illumination of a first detection area within the vehicle;
    an exterior illuminance sensor detecting an exterior illumination, wherein the exterior illumination is an illumination of a second detection area external of the vehicle;
    an illumination determination unit configured to:
        determine an illumination state based on the interior illumination detected by the interior illuminance sensor and the exterior illumination detected by the exterior illuminance sensor, wherein the illumination state is in a light-adapted state when the interior illumination is greater than the exterior illumination and the illumination state is in a dark-adapted state when the exterior illumination is greater than or equal to the interior illumination,
        determine the present illumination of the vehicle by multiplying an increasing rate by the interior illumination, in the light-adapted state,
        determine the present illumination of the vehicle by multiplying a decreasing rate by the exterior illumination, in the dark-adapted state; and
    a brightness control unit configured to control the brightness at a brightness corresponding to the present illumination determined by the illumination determination unit.

2. The headup display device according to claim 1, wherein in the light-adapted state, the illumination determination unit is further configured to:
    set a rate, which is to be multiplied by the interior illumination for determining the present illumination, to the increasing rate when an illumination difference between the interior illumination and the exterior illumination is greater than or equal or a predetermined light adaptation threshold; and
    switch the rate, which is to be multiplied by the interior illumination for determining the present illumination, from the increasing rate to a constant rate when the illumination difference is less than the predetermined light adaptation threshold.

3. The headup display device according to claim 1, wherein in the dark-adapted state, the illumination determination unit is further configured to:
    set a rate, which is to be multiplied by the exterior illumination for determining the present illumination, to the decreasing rate when an illumination difference between the interior illumination and the exterior illumination is greater than or equal to a predetermined dark adaptation threshold; and
    switch the rate, which is to be multiplied by the exterior illumination for determining the present illumination, from the decreasing rate to a constant rate when the illumination difference is less than the predetermined dark adaptation threshold.

4. The headup display device according to claim 2, wherein the illumination determination unit is further configured to determine the illumination difference according to the exterior illumination in a vehicle front region including a focus position of the virtual image.

5. The headup display device according to claim 3, wherein the illumination determination unit is further configured to determine the illumination difference according to the exterior illumination in a vehicle front region including a focus position of the virtual image.

6. The headup display device according to claim 2, wherein the brightness control unit includes a storage unit configured to store a correlation, which is common in a relation between the interior illumination and the exterior illumination, as a correlation between the present illumination determined by the illumination determination unit and the brightness corresponding to the present illumination.

7. The headup display device according to claim 3, wherein the brightness control unit includes a storage unit configured to store a correlation, which is common in a relation between the interior illumination and the exterior illumination, as a correlation between the present illumination determined by the illumination determination unit and the brightness corresponding to the present illumination.

8. A method for indicating a virtual image in an interior of a vehicle according to a present illumination in an environment of the vehicle, the method comprising:

detecting an interior illumination, wherein the interior illumination is an illumination of a first detection area within the vehicle;

detecting an exterior illumination, wherein the exterior illumination is an illumination of a second detection area external of the vehicle;

determining an illumination state based on the interior illumination and the exterior illumination, wherein the illumination state is in a light-adapted state when the interior illumination is greater than the exterior illumination and the illumination state is in a dark-adapted state when the exterior illumination is greater than or equal to the interior illumination;

determining the present illumination of the vehicle by multiplying an increasing rate by the interior illumination, in the light-adapted state;

determining the present illumination of the vehicle by multiplying a decreasing rate by the exterior illumination, in the dark-adapted state;

controlling a brightness of an image corresponding to the determined present illumination; and projecting the image to a front windshield of the vehicle to indicate the image as the virtual image in the interior of the vehicle.

* * * * *